United States Patent
Li et al.

(10) Patent No.: US 11,195,248 B2
(45) Date of Patent: Dec. 7, 2021

(54) METHOD AND APPARATUS FOR PROCESSING PIXEL DATA OF A VIDEO FRAME

(71) Applicant: Beijing Baidu Netcom Science and Technology Co., Ltd., Beijing (CN)

(72) Inventors: Minglu Li, Beijing (CN); Feifei Cao, Beijing (CN); Chunyang Su, Beijing (CN); Sheng Fu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 106 days.

(21) Appl. No.: 16/564,003

(22) Filed: Sep. 9, 2019

(65) Prior Publication Data
US 2020/0202479 A1   Jun. 25, 2020

(30) Foreign Application Priority Data
Dec. 20, 2018   (CN) .......................... 201811591366.5

(51) Int. Cl.
*G06T 1/20* (2006.01)
*G06T 1/60* (2006.01)
(Continued)

(52) U.S. Cl.
CPC .................. *G06T 1/60* (2013.01); *G06T 1/20* (2013.01); *G06T 11/001* (2013.01); *G06T 15/04* (2013.01);
(Continued)

(58) Field of Classification Search
None
See application file for complete search history.

(56) References Cited

U.S. PATENT DOCUMENTS 6,480,200 B1 * 11/2002 Fisher .................... G06T 1/60
                                                    345/552
9,489,710 B2    11/2016 Wang
                      (Continued)

FOREIGN PATENT DOCUMENTS

CN        101951517 A       1/2011
CN        104157004 A      11/2014
                      (Continued)

OTHER PUBLICATIONS

Julius Sandgren, "Transfer time reduction of data transfers between CPU and GPU," Jul. 2013, Teknisk-naturvetenskaplig fakultet UTH-enheten, p. 9, 16-18, 20, http://www.teknat.uu.se/student. (Year: 2013).*

*Primary Examiner* — Joni Hsu
(74) *Attorney, Agent, or Firm* — The Webb Law Firm

(57) ABSTRACT

Embodiments of the present disclosure disclose a method and apparatus for processing a video frame. A specific embodiment of the method includes: receiving a video frame set; selecting a video frame from the video frame set, and performing following processing: creating a pixel buffer object newly; reading pixel data of the selected video frame from a frame buffer corresponding to a central processing unit, and writing the read pixel data into the newly created pixel buffer object; storing the written pixel buffer object into a pixel buffer object queue; determining whether an unselected video frame is present in the video frame set; and storing the video frame set in response to determining no unselected video frame being present in the video frame set.

9 Claims, 5 Drawing Sheets

(51) Int. Cl.
*G06T 11/00* (2006.01)
*H04N 19/152* (2014.01)
*H04N 19/172* (2014.01)
*G09G 3/00* (2006.01)
*G06T 15/04* (2011.01)

(52) U.S. Cl.
CPC ............ *G09G 3/00* (2013.01); *H04N 19/152* (2014.11); *H04N 19/172* (2014.11)

(56) References Cited

U.S. PATENT DOCUMENTS

| | | |
|---|---|---|
| 2005/0012751 A1 | 1/2005 | Karlov |
| 2006/0290702 A1* | 12/2006 | White ................... G06T 15/503 |
| | | 345/522 |
| 2008/0204598 A1* | 8/2008 | Maurer ................ H04N 19/521 |
| | | 348/584 |
| 2019/0045217 A1* | 2/2019 | Gokhale ................ H04N 19/58 |

FOREIGN PATENT DOCUMENTS

| | | |
|---|---|---|
| CN | 104869287 A | 8/2015 |
| CN | 105741228 A | 7/2016 |
| CN | 106127673 A | 11/2016 |
| CN | 106598739 A | 4/2017 |
| CN | 107209923 A | 9/2017 |
| CN | 107277616 A | 10/2017 |
| CN | 108696771 A | 10/2018 |

\* cited by examiner

METHOD AND APPARATUS FOR PROCESSING PIXEL DATA OF A VIDEO FRAME

CROSS-REFERENCE TO RELATED APPLICATION

This application claims priority to Chinese Application No. 201811591366.5 filed Dec. 20, 2018, the disclosure of which is hereby incorporated by reference in its entirety.

TECHNICAL FIELD

Embodiments of the present disclosure relate to the field of computer technology, and specifically to a method and apparatus for processing a video frame.

BACKGROUND

On a mobile device, a process that a video frame acquired from a camera or other collection devices is finally previewed by a user generally needs a large amount of rendering processing.

Rendering is used to describe a process that an effect in a video editing file is calculated to generate a final video output. Real-time rendering generally refers to the real-time calculation and the real-time output of graphic data.

SUMMARY

Embodiments of the present disclosure propose a method and apparatus for processing a video frame.

In a first aspect, some embodiments of the present disclosure provide a method for processing a video frame. The method includes: receiving a video frame set; and selecting a video frame from the video frame set, and performing following processing: creating a pixel buffer object newly; reading pixel data of the selected video frame from a frame buffer corresponding to a central processing unit, and writing the read pixel data into the newly created pixel buffer object; and storing the written pixel buffer object into a pixel buffer object queue; determining whether an unselected video frame is present in the video frame set; and storing the video frame set in response to determining no unselected video frame being present in the video frame set.

In some embodiments, the method further includes: re-selecting, in response to determining the unselected video frame being present in the video frame set, the unselected video frame from the video frame set, and continuing performing the processing.

In some embodiments, the method further includes: selecting a pixel buffer object from the pixel buffer object queue according to an order of the pixel buffer object queue; reading pixel data from the selected pixel buffer object; writing the read pixel data into a frame buffer corresponding to a graphics processing unit; and deleting the selected pixel buffer object from the pixel buffer object queue.

In some embodiments, the method further includes: generating a texture image according to the pixel data written into the frame buffer corresponding to the graphics processing unit.

In some embodiments, the method further includes: determining whether a frame cache object is present in the graphics processing unit; creating, in response to determining no frame cache object being present, a frame cache object newly, and mounting the generated texture image onto the newly created frame cache object; and mounting, in response to determining the frame cache object being present, the generated texture image onto the frame cache object.

In some embodiments, the method further includes: separating the mounted texture image from the frame cache object in an order of mounting, and outputting the separated texture image.

In a second aspect, some embodiments of the present disclosure provide an apparatus for processing a video frame. The apparatus includes: a receiving unit, configured to receive a video frame set; a processing unit, configured to select a video frame from the video frame set, and perform following processing: creating a pixel buffer object newly; reading pixel data of the selected video frame from a frame buffer corresponding to a central processing unit, and writing the read pixel data into the newly created pixel buffer object; and storing the written pixel buffer object into a pixel buffer object queue; a determining unit, configured to determine whether an unselected video frame is present in the video frame set; and a storing unit, configured to store the video frame set in response to determining no unselected video frame being present in the video frame set.

In some embodiments, the apparatus further includes: a re-selecting unit, configured to re-select, in response to determining the unselected video frame being present in the video frame set, the unselected video frame from the video frame set, and continue performing the processing.

In some embodiments, the apparatus further includes: a selecting unit, configured to select a pixel buffer object from the pixel buffer object queue according to an order of the pixel buffer object queue; a reading unit, configured to read pixel data from the selected pixel buffer object; a writing unit, configured to write the read pixel data into a frame buffer corresponding to a graphics processing unit; and a deleting unit, configured to delete the selected pixel buffer object from the pixel buffer object queue.

In some embodiments, the apparatus further includes: a generating unit, configured to generate a texture image according to the pixel data written into the frame buffer corresponding to the graphics processing unit.

In some embodiments, the apparatus further includes: a determining unit, configured to determine whether a frame cache object is present in the graphics processing unit; a newly-creating unit, configured to create, in response to determining no frame cache object being present, a frame cache object newly, and mount the generated texture image onto the newly created frame cache object; and a mounting unit, configured to mount, in response to determining the frame cache object being present, the generated texture image onto the frame cache object.

In some embodiments, the apparatus further includes: a separating unit, configured to separate the mounted texture image from the frame cache object in an order of mounting, and output the separated texture image.

In a third aspect, some embodiments of the present disclosure provide an electronic device. The electronic device includes: one or more processors; and a storage device, configured to store one or more programs. The one or more programs, when executed by the one or more processors, cause the one or more processors to implement the method described in any embodiment in the first aspect.

In a fourth aspect, some embodiments of the present disclosure provide a computer readable medium storing a computer program. The program, when executed by a processor, implements the method described in any embodiment in the first aspect.

According to the method and apparatus for processing a video frame provided by some embodiments of the present disclosure, the video frame set is first received. Next, the video frame is selected from the video frame set, and the following processes are performed. The pixel buffer object is newly created. Then, the reading pixel data of the selected video frame is read from the frame buffer corresponding to the central processing unit, and the read pixel data is written into the newly created pixel buffer object. Afterwards, the written pixel buffer object is stored into the pixel buffer object queue. Next, whether the unselected video frame is present in the video frame set is determined. Finally, in response to determining no unselected video frame being present in the video frame set, the video frame set is stored. By newly creating the pixel buffer object to store the data in the video frame, the data in the video frame may be cached without wasting the cycles of the central processing unit, which helps to improve the efficiency of the processing on the video frame.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail by combining the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
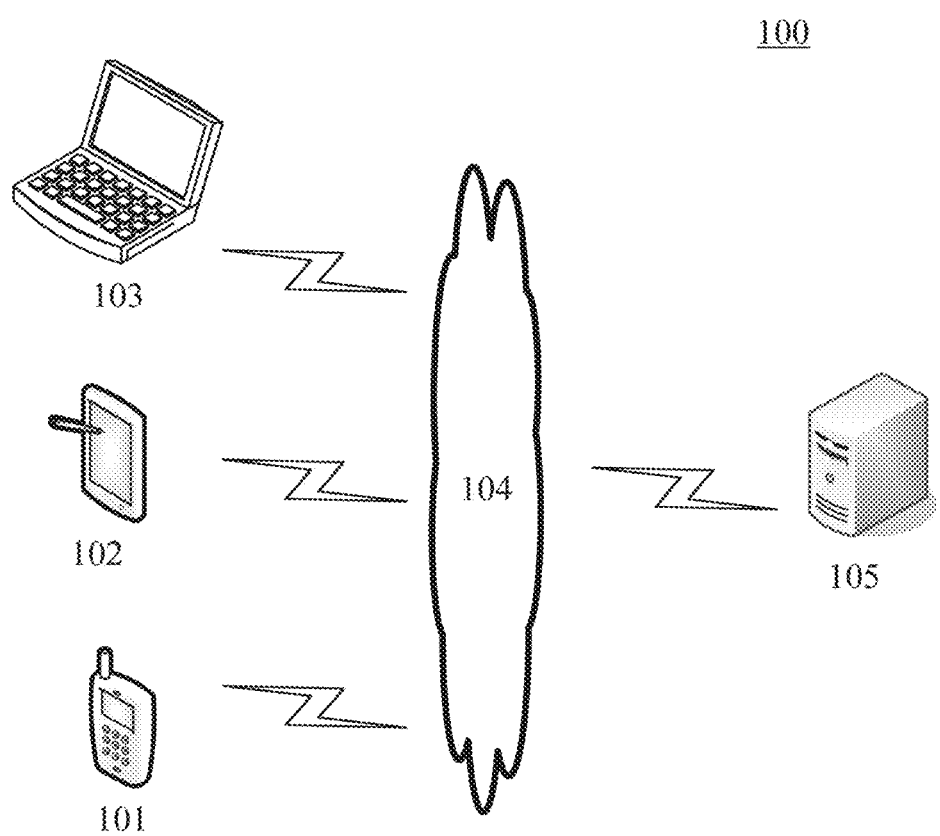
FIG. 1 is a diagram of an example system architecture in which an embodiment of the present disclosure may be implemented.

FIG. 1 shows an example system architecture 100 in which an embodiment of a method for processing a video frame or an apparatus for processing a video frame according to some embodiments of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

The terminal devices 101, 102 and 103 may be hardware or software. When being the hardware, the terminal devices 101, 102 and 103 may be various electronic devices, the electronic devices including, but not limited to, a smart phone, a tablet computer, an e-book reader, a laptop portable computer and a desktop computer. When being the software, the terminal devices 101, 102 and 103 may be installed in the above-listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various kinds of services, for example, a server performing a rendering process on a video on the terminal device 101. A backend video rendering server may perform the rendering process, etc. on a received video frame, and feed back the processing result (e.g., the rendered video frame) to the terminal device.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

The terminal device 101 may also directly process the received video frame without interacting with the server 105.

It should be noted that the method for processing a video frame provided by some embodiments of the present disclosure may be performed by the terminal device 101 or performed by the server 105. Correspondingly, the apparatus for processing a video frame may be provided in the terminal device 101 or provided in the server 105, which will not be specifically defined here.

It should be appreciated that the numbers of the terminal devices, the networks, and the servers in FIG. 1 are merely illustrative. Any number of terminal devices, networks and servers may be provided based on actual requirements.

Figure 2:
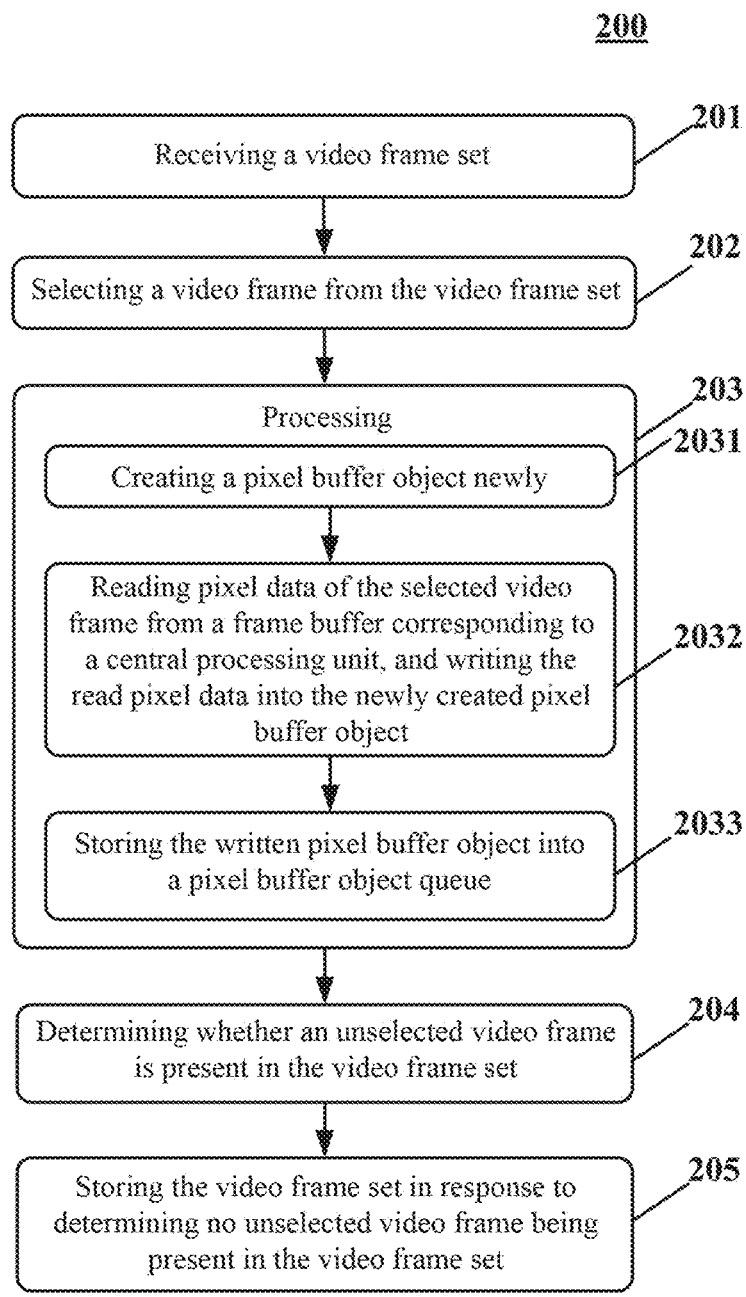
FIG. 2 is a flowchart of a method for processing a video frame according to an embodiment of the present disclosure.

Further referring to FIG. 2, FIG. 2 illustrates a flow 200 of a method for processing a video frame according to an embodiment of the present disclosure. The method for processing a video frame includes the following steps.

Step 201, receiving a video frame set.

In this embodiment, an executing body (e.g., the server shown in FIG. 1) of the method for processing a video frame may receive the video frame set in various ways. As an example, a video may be collected by a camera installed in a terminal device, and the terminal device is communicated with the executing body. The executing body may receive the video, which is collected by the terminal device through the camera. As another example, the camera may be installed in the executing body, and the executing body may directly receive the video collected by the camera.

Step 202, selecting a video frame from the video frame set.

In this embodiment, the executing body may select the video frame from the video frame set received in step 201, and perform processing in step 203. The approach to selecting the video frame is not limited in the present disclosure.

For example, the video frame may be randomly selected, or the video frames in the video frame set may be sorted to select the video frame in order.

Step 203, performing processing.

Step 2031, creating a pixel buffer object newly.

In this embodiment, the pixel buffer object (PBO) is an extension of a vertex buffer object (VBO), and the pixel buffer object is used to store pixel data. The method of newly creating the pixel buffer object is generally implemented based on an internal method of OpenGL, which will not be repeatedly described here.

Step 2032, reading pixel data of the selected video frame from a frame buffer corresponding to a central processing unit, and writing the read pixel data into the newly created pixel buffer object.

In this embodiment, the central processing unit (CPU) is a very-large-scale integrated circuit, and is the computing core and the control unit of a computer. The function of the central processing unit is mainly to explain a computer instruction and process data in computer software. Here, the central processing unit refers to the central processing unit of the terminal where the executing body is located, and the frame buffer corresponding to the central processing unit refers to the memory (random access memory, RAM) corresponding to the central processing unit.

Step 2033, storing the written pixel buffer object into a pixel buffer object queue.

In this embodiment, the pixel buffer object queue is a queue with an element being a pixel buffer object.

Step 204, determining whether an unselected video frame is present in the video frame set.

In this embodiment, if the executing body determines that no unselected video frame is present in the video frame set, step 205 may be continued. If the executing body determines that the unselected video frame is present in the video frame set, the unselected video frame may be re-selected from the video frame set, and steps 2031-2033 may be performed.

Step 205, storing the video frame set in response to determining no unselected video frame being present in the video frame set.

In this embodiment, the storing approach may refer to that the executing body locally stores a queue group, or refer to that the video frame set is sent to a specified database server and stored into the database server.

According to the method provided by the above embodiment of the present disclosure, the processing on the video frame is implemented. By newly creating the pixel buffer object to store the data in the video frame, the data in the video frame may be cached without wasting the cycles of the central processing unit, which helps to improve the efficiency of the processing on the video frame.

Figure 3:
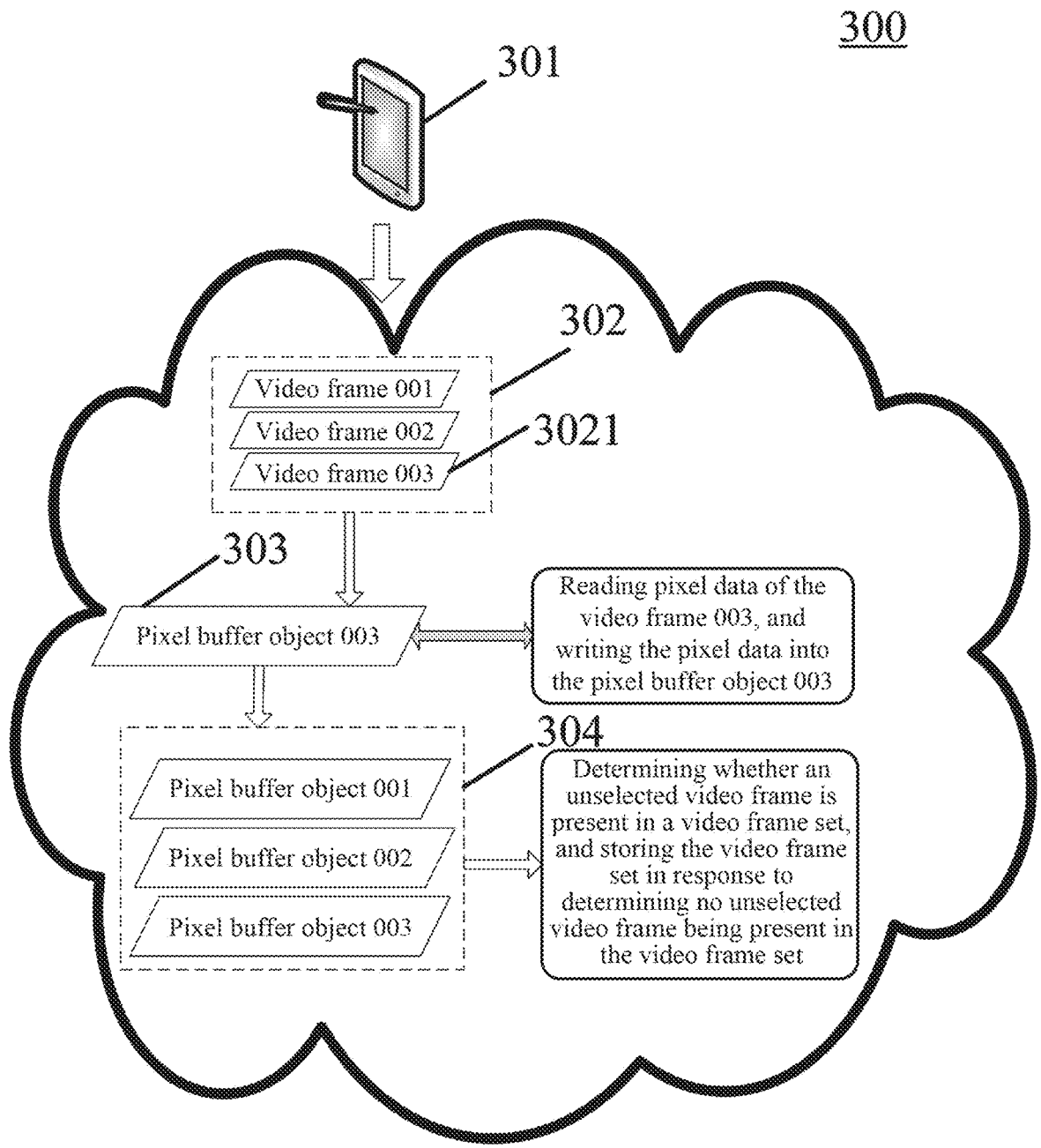
FIG. 3 is a schematic diagram of an application scenario of the method for processing a video frame according to an embodiment of the present disclosure.

Further referring to FIG. 3, FIG. 3 is a schematic diagram of an application scenario of the method for processing a video frame according to this embodiment. In the application scenario 300 of FIG. 3, the terminal device 301 first receives the video frame set 302. Then, the terminal device 301 may select the video frame 3021 from the video frame set 302, to create the pixel buffer object 303 newly. Finally, the terminal device 301 may read the pixel data of the selected video frame 3021 from the frame buffer corresponding to the central processing unit in the terminal device 301, and write the read pixel data into the newly created pixel buffer object 303. The written pixel buffer object 303 is stored into the pixel buffer object queue 304. Whether the unselected video frame is present in the video frame set 302 is determined. The video frame set 302 is stored, in response to determining that no unselected video frame is present in the video frame set.

According to the method provided by the above embodiment of the present disclosure, the processing on the video frame is implemented. By newly creating the pixel buffer object to store the data in the video frame, the data in the video frame may be cached, and the central processing unit may continuously receive the video frame without waiting, which does not waste the cycles of the central processing unit, thus helping to improve the efficiency of the processing on the video frame.

Figure 4:
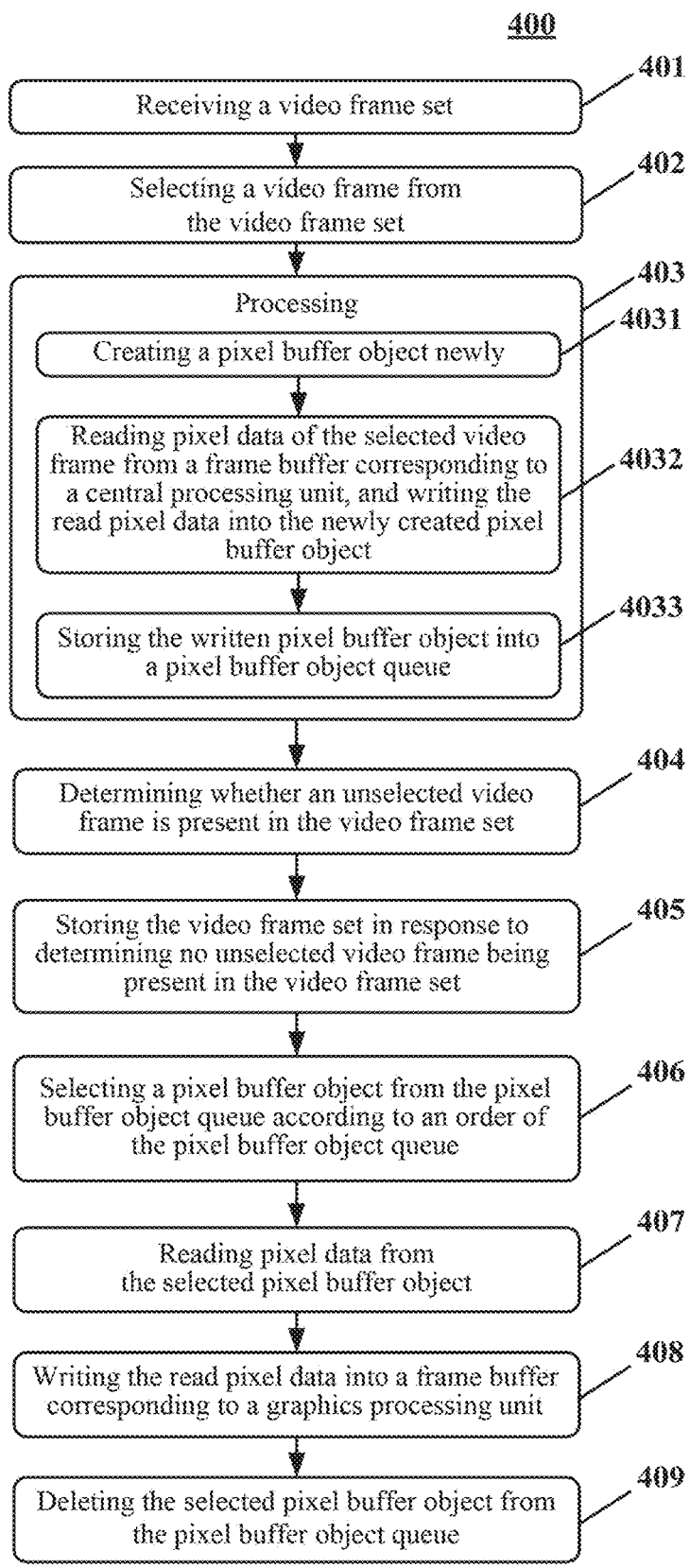
FIG. 4 is a flowchart of the method for processing a video frame according to another embodiment of the present disclosure.

Further referring to FIG. 4, FIG. 4 illustrates a flow 400 of another embodiment of the method for processing a video frame. The flow 400 of the method for processing a video frame includes the following steps.

Step 401, receiving a video frame set.

Step 402, selecting a video frame from the video frame set.

Step 403, performing processing.

Step 4031, creating a pixel buffer object newly.

Step 4032, reading pixel data of the selected video frame from a frame buffer corresponding to a central processing unit, and writing the read pixel data into the newly created pixel buffer object.

Step 4033, storing the written pixel buffer object into a pixel buffer object queue.

Step 404, determining whether an unselected video frame is present in the video frame set.

Step 405, storing the video frame set in response to determining no unselected video frame being present in the video frame set.

In this embodiment, the specific operations of steps 403-405 are substantially the same as the operations of steps 203-205 in the embodiment shown in FIG. 2, which will not be repeatedly described here.

Step 406, selecting a pixel buffer object from the pixel buffer object queue according to an order of the pixel buffer object queue.

In this embodiment, the order of the pixel buffer object queue generally refers to the order in which elements are stored into the pixel buffer object queue.

Step 407, reading pixel data from the selected pixel buffer object.

Step 408, writing the read pixel data into a frame buffer corresponding to a graphics processing unit.

In this embodiment, the graphics processing unit (GPU), also known as a display core, a visual processing unit or a display chip, is a microprocessor dedicated to performing image computing on a personal computer, a workstation, a game console and some mobile devices (e.g., a tablet computer and a smartphone).

Step 409, deleting the selected pixel buffer object from the pixel buffer object queue.

In this embodiment, the selected pixel buffer object refers to the pixel buffer object in the seventh step, from which the pixel data is read. Alternatively, the ninth step may also be: removing the selected pixel buffer object out of the pixel buffer object queue, and writing the pixel data read from the frame buffer corresponding to the central processing unit into the removed pixel buffer object; and then, adding the written pixel buffer object to the pixel buffer object queue.

In some alternative implementations of this embodiment, the method may further include: generating a texture image according to the pixel data written into the frame buffer corresponding to the graphics processing unit.

The method of generating the texture image is generally implemented based on an internal method of OpenGL, which will not be repeatedly described here.

Alternatively, the method may further include: determining whether a frame cache object is present in the graphics processing unit; creating, in response to determining no frame cache object being present, a frame cache object newly, and mounting the generated texture image onto the newly created frame cache object; and mounting, in response to determining the frame cache object being present, the generated texture image onto the frame cache object.

Here, the mounting is usually to associate the texture image with the frame cache object, and the specific association approach may be based on the serial number of a texture. Alternatively, the texture image herein may also be replaced with a rendering cache image. That is, a frame cache object may be associated with a plurality of texture images or rendering cache images, thereby implementing the effect of cascading the texture image.

Alternatively, the method may further include: separating the mounted texture image from the frame cache object in an order of mounting, and outputting the separated texture image.

The separating according to the order of mounting and the outputting may realize the cascading effect of the texture image, and achieve the asynchronous effect between the steps of the separating and the outputting and the step of the mounting. The approach to mounting a plurality of texture images using the frame cache object helps to improve the transmission efficiency of the texture image.

The frame cache object separates the mounted texture image from the frame cache object, and then mounts the new texture image to the frame cache object. Only one frame cache object is needed to switch the plurality of texture images, and the switching between the texture images is faster than the switching between frame cache objects, which helps to improve the switching efficiency. The switching between the frame cache objects refers to that the frame cache object is newly created, the texture image is mounted onto the newly created frame cache object, and then the frame cache object is outputted. When a next texture image is received, a frame cache object is newly created again, and so on. Each frame cache object only mounts one texture image. As compared with the switching between the frame cache objects, this implementation improves the efficiency, and does not need to create more frame cache objects, thereby saving the storage space.

It may be seen from FIG. 4 that, as compared with the embodiment corresponding to FIG. 2, the flow 400 of the method for processing a video frame in this embodiment reflects the step of reading the pixel data from the pixel buffer object, the step of storing the pixel data into the graphics processing unit, and the step of deleting the pixel buffer object. The pixel data in the pixel buffer object is transferred to the graphics processing unit, and then the pixel buffer object is deleted. Thus, the cycles of the central processing unit may not be wasted, and the asynchronous effect between the step of storing, by the central processing unit, the pixel data into the pixel buffer object and the step of reading, by the graphics processing unit, the pixel data from the pixel buffer object may be achieved. That is, the central processing unit may return immediately without waiting for the completion of the transmission, which helps to further improve the efficiency of the processing on the video frame.

Figure 5:
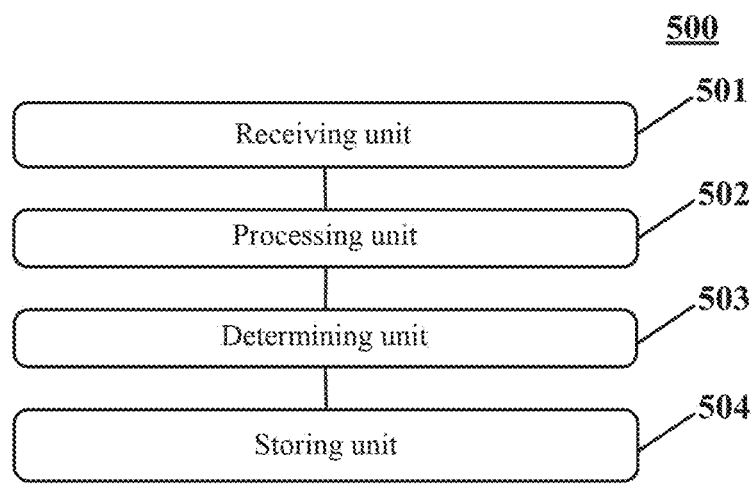
FIG. 5 is a schematic structural diagram of an apparatus for processing a video frame according to an embodiment of the present disclosure.

Further referring to FIG. 5, as an implementation of the method shown in the above drawings, an embodiment of the present disclosure provides an apparatus for processing a video frame. An embodiment of the apparatus may correspond to the embodiment of the method shown in FIG. 2, and the apparatus may be applied in various electronic devices.

As shown in FIG. 5, the apparatus 500 for processing a video frame in this embodiment includes: a receiving unit 501, a processing unit 502, a determining unit 503 and a storing unit 504. The receiving unit 501 is configured to receive a video frame set. The processing unit 502 is configured to select a video frame from the video frame set, and perform following processing: creating a pixel buffer object newly; reading pixel data of the selected video frame from a frame buffer corresponding to a central processing unit, and writing the read pixel data into the newly created pixel buffer object; and storing the written pixel buffer object into a pixel buffer object queue. The determining unit 503 is configured to determine whether an unselected video frame is present in the video frame set. The storing unit 504 is configured to store the video frame set in response to determining no unselected video frame being present in the video frame set.

In this embodiment, for specific processes of the receiving unit 501, the processing unit 502, the determining unit 503 and the storing unit 504 in the apparatus 500 for processing a video frame, and their technical effects, reference may be made to relative descriptions of steps 201-205 in the corresponding embodiment of FIG. 2 respectively, which will not be repeatedly described here.

In some alternative implementations of this embodiment, the apparatus further includes a re-selecting unit. The re-selecting unit is configured to re-select, in response to determining the unselected video frame being present in the video frame set, the unselected video frame from the video frame set, and continue performing the processing.

In some alternative implementations of this embodiment, the apparatus further includes: a selecting unit, configured to select a pixel buffer object from the pixel buffer object queue according to an order of the pixel buffer object queue; a reading unit, configured to read pixel data from the selected pixel buffer object; a writing unit, configured to write the read pixel data into a frame buffer corresponding to a graphics processing unit; and a deleting unit, configured to delete the selected pixel buffer object from the pixel buffer object queue.

In some alternative implementations of this embodiment, the apparatus further includes: a generating unit, configured to generate a texture image according to the pixel data written into the frame buffer corresponding to the graphics processing unit.

In some alternative implementations of this embodiment, the apparatus further includes: a determining unit, configured to determine whether a frame cache object is present in the graphics processing unit; a newly-creating unit, configured to create, in response to determining no frame cache object being present, a frame cache object newly, and mount the generated texture image onto the newly created frame cache object; and a mounting unit, configured to mount, in response to determining the frame cache object being present, the generated texture image onto the frame cache object.

In some alternative implementations of this embodiment, the apparatus further includes: a separating unit, configured to separate the mounted texture image from the frame cache object in an order of mounting, and output the separated texture image.

Figure 6:
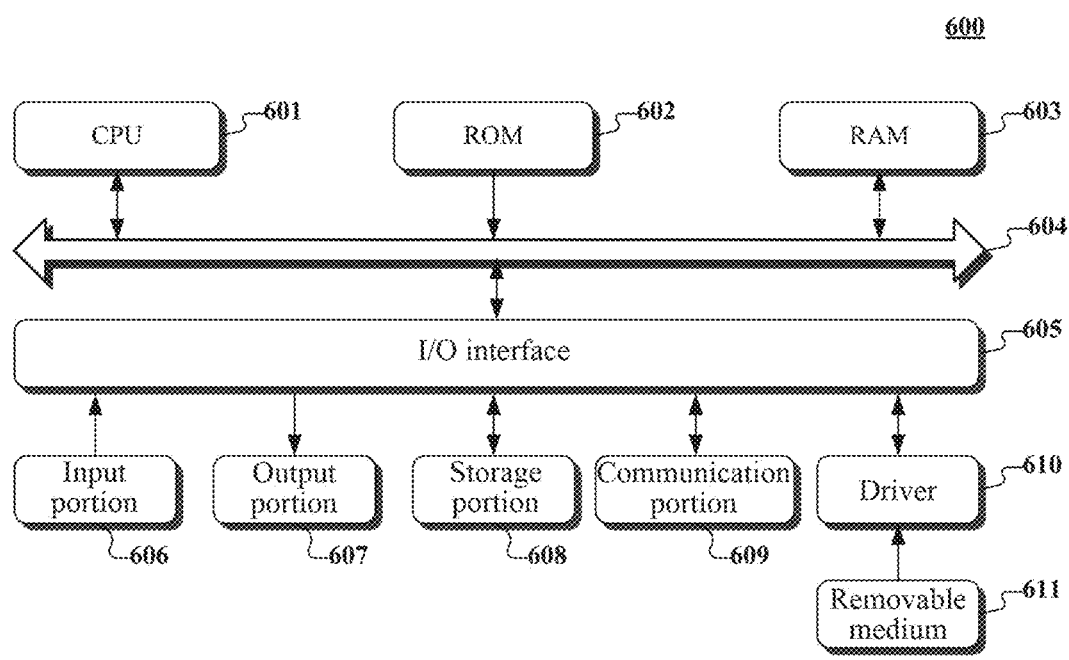
FIG. 6 is a schematic structural diagram of a computer system adapted to implement an electronic device according to embodiments of the present disclosure.

Referring to FIG. 6, FIG. 6 is a schematic structural diagram of a computer system 600 adapted to implement an electronic device of some embodiments of the present disclosure. The server shown in FIG. 6 is merely an example, and should not bring any limitations to the functions and the scope of use of some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker, etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to some embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the methods of some embodiments of the present disclosure.

It should be noted that the computer readable medium in some embodiments of the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs, which may be used by a command execution system, apparatus or element or incorporated thereto. In the some embodiments of present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequence shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor. For example, the processor may be described as: a processor comprising a receiving unit, a processing unit, a determining unit and a storing unit. The names of these units do not in some cases constitute a limitation to such units themselves. For example, the receiving unit may alternatively be described as "a unit for receiving a video frame set."

In another aspect, some embodiments of the present disclosure further provide a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: receive a video frame set; select a video frame from the video frame set, and perform following processing: creating a pixel buffer object newly, reading pixel data of the selected video frame from a frame buffer corresponding to a central processing unit, writing the read pixel data into the newly created pixel buffer object, and storing the written pixel buffer object into a pixel buffer object queue; determine whether an unselected video frame is present in the video frame set; and store the video frame set in response to determining no unselected video frame being present in the video frame set.

The above description is only an explanation for embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for processing a video frame, comprising:
receiving a video frame set;
selecting a video frame from the video frame set, and performing following processing: creating a pixel buffer object newly; reading pixel data of the selected video frame from a frame buffer corresponding to a central processing unit, and writing the read pixel data into the newly created pixel buffer object; and storing the written pixel buffer object into a pixel buffer object queue;
determining whether an unselected video frame is present in the video frame set;
storing the video frame set in response to determining no unselected video frame being present in the video frame set;
generating a texture image according to the pixel data written into the frame buffer corresponding to a graphics processing unit;
determining whether a frame cache object is present in the graphics processing unit;
creating, in response to determining no frame cache object being present, a frame cache object newly, and mounting the generated texture image onto the newly created frame cache object; and
mounting, in response to determining the frame cache object being present, the generated texture image onto the frame cache object.

2. The method according to claim 1, further comprising:
re-selecting, in response to determining the unselected video frame being present in the video frame set, the unselected video frame from the video frame set, and continuing performing the processing.

3. The method according to claim 1, further comprising:
selecting a pixel buffer object from the pixel buffer object queue according to an order of the pixel buffer object queue;
reading pixel data from the selected pixel buffer object;
writing the read pixel data into a frame buffer corresponding to the graphics processing unit; and
deleting the selected pixel buffer object from the pixel buffer object queue.

4. The method according to claim 1, further comprising:
separating the mounted texture image from the frame cache object in an order of mounting, and outputting the separated texture image.

5. An apparatus for processing a video frame, comprising:
at least one processor; and
a memory storing instructions, the instructions when executed by the at least one processor, cause the at least one processor to perform operations, the operations comprising:
receiving a video frame set;
selecting a video frame from the video frame set, and performing following processing: creating a pixel buffer object newly; reading pixel data of the selected video frame from a frame buffer corresponding to a central processing unit, and writing the read pixel data into the newly created pixel buffer object; and storing the written pixel buffer object into a pixel buffer object queue;
determining whether an unselected video frame is present in the video frame set;
storing the video frame set in response to determining no unselected video frame being present in the video frame set;
generating a texture image according to the pixel data written into the frame buffer corresponding to a graphics processing unit;
determining whether a frame cache object is present in the graphics processing unit;
creating, in response to determining no frame cache object being present, a frame cache object newly, and mounting the generated texture image onto the newly created frame cache object; and
mounting, in response to determining the frame cache object being present, the generated texture image onto the frame cache object.

6. The apparatus according to claim 5, the operations further comprising:
re-selecting, in response to determining the unselected video frame being present in the video frame set, the unselected video frame from the video frame set, and continuing performing the processing.

7. The apparatus according to claim 5, the operations further comprising:
selecting a pixel buffer object from the pixel buffer object queue according to an order of the pixel buffer object queue;
reading pixel data from the selected pixel buffer object;
writing the read pixel data into a frame buffer corresponding to the graphics processing unit; and
deleting the selected pixel buffer object from the pixel buffer object queue.

8. The apparatus according to claim 5, the operations further comprising:
separating the mounted texture image from the frame cache object in an order of mounting, and outputting the separated texture image.

9. A non-transitory computer readable storage medium, storing a computer program, wherein the computer program, when executed by a processor, causes the processor to perform operations, the operations comprising:
  receiving a video frame set;
  selecting a video frame from the video frame set, and performing following processing: creating a pixel buffer object newly; reading pixel data of the selected video frame from a frame buffer corresponding to a central processing unit, and writing the read pixel data into the newly created pixel buffer object; and storing the written pixel buffer object into a pixel buffer object queue,
  determining whether an unselected video frame is present in the video frame set;
  storing the video frame set in response to determining no unselected video frame being present in the video frame set;
  generating a texture image according to the pixel data written into the frame buffer corresponding to a graphics processing unit;
  determining whether a frame cache object is present in the graphics processing unit;
  creating, in response to determining no frame cache object being present, a frame cache object newly, and mounting the generated texture image onto the newly created frame cache object; and
  mounting, in response to determining the frame cache object being present, the generated texture image onto the frame cache object.

* * * * *